United States Patent [19]

Kirsch

[11] 4,364,035

[45] Dec. 14, 1982

[54] ELECTRO-OPTICAL MOUSE

[76] Inventor: Steven T. Kirsch, 655 S. Fairoaks Ave., #D313, Sunnyvale, Calif. 94086

[21] Appl. No.: 273,641

[22] Filed: Jun. 15, 1981

Related U.S. Application Data

[63] Continuation-in-part of Ser. No. 264,478, May 18, 1981.

[51] Int. Cl.³ .............................................. G08B 5/36
[52] U.S. Cl. ...................................... 340/710; 178/18; 250/226; 250/237 R; 340/707
[58] Field of Search ....................... 340/706, 707, 710; 250/237 R, 237 G, 226

[56] References Cited

U.S. PATENT DOCUMENTS

| | | | |
|---|---|---|---|
| 3,182,291 | 5/1965 | Nassimbene | 340/146.3 |
| 3,297,879 | 1/1967 | Meyer | 250/202 X |
| 3,298,015 | 1/1967 | Herman | 250/226 X |
| 3,344,700 | 10/1967 | Brake | 250/237 G |
| 3,541,541 | 11/1970 | Engelbart | 340/710 |
| 3,586,861 | 6/1971 | Wernikoff | 250/217 |
| 4,040,741 | 8/1977 | Swift | 250/226 X |
| 4,184,044 | 1/1980 | Zwerenz | 178/18 |
| 4,239,393 | 12/1980 | Tobias | 250/226 X |
| 4,303,914 | 12/1981 | Page | 340/710 X |

*Primary Examiner*—David L. Trafton
*Attorney, Agent, or Firm*—Thomas Schneck

[57] ABSTRACT

A position control system employing a movable detector means which slides over a surface having passive, position related marks of two colors. In the preferred embodiment, the detector means includes a light source which sequentially alternates between one color and the other. A four-quadrant light detector is positioned for receiving the light reflected from the two groups of lines. By clocking emission of the two colors and the detector output signal, electrical outputs are obtained representing reflection from the first and second groups of lines. Such signals are used to establish line crossings, thereby deriving a position signal for a cursor or the like. In an alternate embodiment, continuous sources of the two colors are used to illuminate the lines. Two dual-segment detectors, each sensitive to one of the colors, are used to generate outputs indicative of line crossings, thereby deriving the position signal for a cursor.

10 Claims, 7 Drawing Figures

ELECTRO-OPTICAL MOUSE

CROSS REFERENCE TO RELATED APPLICATION

This is a continuation-in-part of application Ser. No. 264,478, filed May 18, 1981.

TECHNICAL FIELD

A mouse is a pointing device, typically for use with visual display systems in which a transducer converts translational motion of a housing into a position signal for controlling movement of a cursor associated with a visual display system. More particularly, the present invention relates to such a system in which the transducer is electronic and movement of the housing is sensed by electromagnetic energy.

BACKGROUND ART

A mouse must be distinguished from other cursor control systems, such as light pens and interactive tablets. These are devices in which electrical or electromagnetic energy is communicated from a wand or other movable member to energy receptors within an active surface, grid or the like. On the other hand, a mouse moves over a passive surface, such as a sheet of paper, or the like.

A mouse must also be distinguished from a joy stick control. A joy stick includes a lever, usually connected to a bearing. As the lever is moved and the bearing is rotated correspondingly. Bearing motion is sensed by potentiometers corresponding to different directions of bearing rotation. The output signal from a joy stick may be used for the same purpose as the output signal from a mouse. Both may be used to control a cursor. The distinguishing feature of a mouse is that two-dimensional motion over a surface corresponds directly with two-dimensional motion of a cursor in a graphic display.

A mouse should also be distinguished from bar code systems. In those systems, bar code is applied to a surface for indicating data, such as type of merchandise, price and manufacturer. The bar code typically produces an analog signal which may be read optically or magnetically. In U.S. Pat. No. 4,245,152 to Flurry et al., an ETAB (every transition a bit) code is described. Such systems do not yield positional information, as mice do.

Most of the mice of the prior art are mechanical systems involving wheels or rollers which maintain frictional contact with a surface. For example, U.S. Pat. No. 3,541,541 to D. Engelbart shows a well-known and widely accepted mechanical mouse. There are certain mechanical problems which are inherent with these mice, such as the problem in maintaining good frictional contact with a surface. If a mechanical mouse encounters a slippery portion of a surface, the resulting output signal will be inaccurate.

Mechanical mice use a relatively large number of close tolerance parts and are difficult to make in mass production. Moreover, mechanical mice are subject to mechanical "noise", such as lash and vibration, and require frequent cleaning.

An object of the present invention was to devise a non-mechanical mouse, specifically one which relied upon electromagnetic energy transmitted to and radiated back from a surface in order to translate positional motion relative to the surface into an electrical signal for control of a cursor or similar device.

DISCLOSURE OF INVENTION

The above object has been achieved with a position control system employing dual color, position related lines on a reflective surface, such as a two color grid of lines. These lines are illuminated by a dual color monochromatic light source (e.g. a two color LED) which rapidly and continuously switches from one color to the other. The colors of the light source are selected to match the spectral transmissivity of the two colors on the surface. An illuminated area is imaged onto a light detector, within a housing, movable over the surface. During illumination by light of one color the detector can distinguish lines only of the opposite color. Hence, as the focal area within the housing crosses lines of different color, the detector senses changes in contrast ratio and generates electrical signals representing the line crossings. If the lines are arranged in a grid, line crossings of one color may represent vertical distance, while line crossings of another color may represent horizontal distance. The crossings may be counted by X and Y registers for controlling a cursor.

One of the advantages of this system over mechanical mice is that it is relatively simple to manufacture in large quantities because there are no close tolerance parts. Another advantage is that there is little or no mechanical noise and little or no inherent electrical noise. Another advantage is that the present system uses off-the-shelf or easily made components. Still another advantage is that it has the same sensitivity, or perhaps better, than a mechanical mouse. Yet another advantage is that a version of the present mouse is able to detect rotation, while most mechanical mice cannot.

BEST MODE FOR CARRYING OUT THE INVENTION

Figures 1, 6:
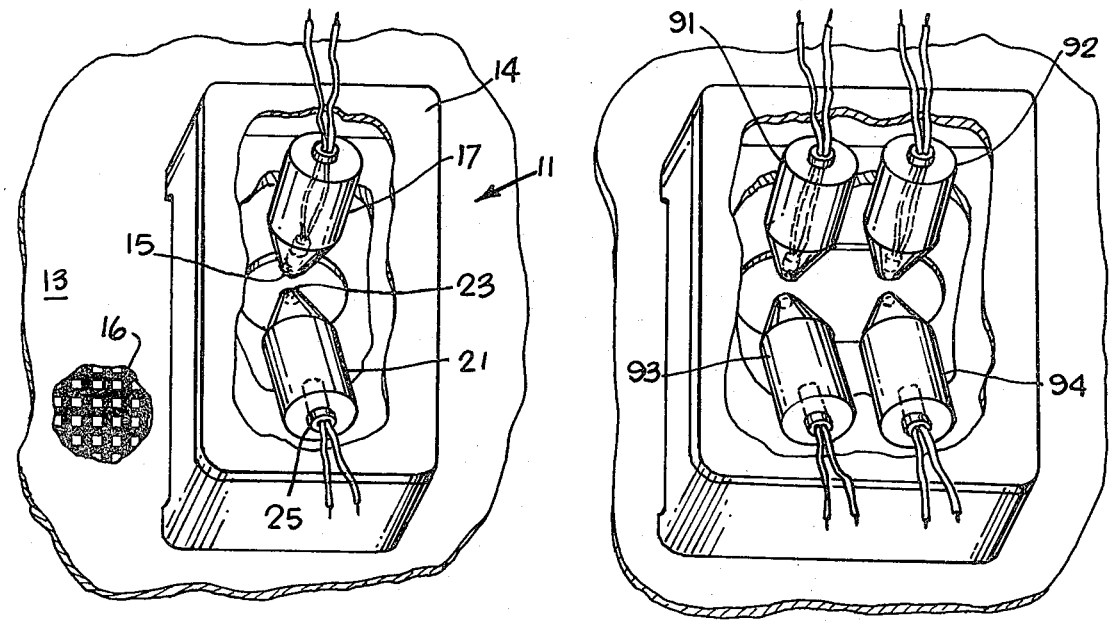
FIG. 1 is a perspective plan view of the electro-optical mouse of the present invention.
FIG. 6 is a perspective plan view of a dual detector mouse for sensing rotation, as well as translation.
Figure 2:
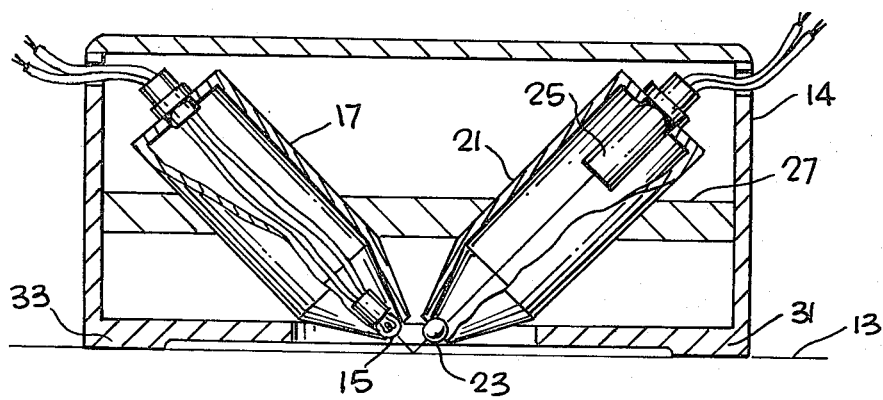
FIG. 2 is a side view of the apparatus shown in FIG. 1.

FIGS. 1 and 2 show two assemblies used in the present invention. These assemblies, together with connected electronic circuits form the electronic mouse of the present invention.

A first assembly is the movable detector means 11. This detector means includes a housing 14, containing a light source 15 as well as a photodetector 25. The housing is gripped by human hand and pushed in any direction on surface 13, corresponding to the direction and extent to which it is desired to move a cursor, or similar device.

Source 15 is a light emitting diode (LED) which is aimed downwardly at a spot on surface 13. The LED may be mounted in a light tight tube or may be directly aimed at the surface. Preferably, the LED is mounted close to the surface so that light arriving at the surface will be in a relatively narrow spot, i.e., a spot with a diameter of less than 1.0 mm. A typical two color LED is General Instruments 5491.

Also mounted in housing 14 is a detector tube 21 having at its forward end an imaging lens 23 which is a glass bead. Tube 21 is not necessary so long as the LED is sufficiently close to the surface so that the detector does not detect light directly from the LED. The lens is focussed on a spot which is small enough so that only one line of the same color is observed at any housing location. This is explained below with reference to FIG. 3a. Lens 23 is mounted so that it is slightly more than one focal length from surface 13. The remainder of tube 21 is generally light tight. At the rear of tube 21 is a four-quadrant light detector 25 which receives a magnified image of a portion of surface 13 via the imaging lens 23. The image of a line can be any size greater than the linear dimension of the detector. The spacing between the four-quadrant detector 25 and lens 23 is one wherein the four-quadrant detector is about eight focal lengths from lens 23. The distance is typically about 2 cm., it could be more or less. The diameter of the bead, forming image lens 23, is approximately 3 or 4 mm., but could be more or less.

In FIG. 2, housing 14 is seen to include a planar central shelf 27 through which tube 21 and detector 25 extend angularly downward and are held in place therein. Similarly, light source 15 is held in place by the shelf 27.

Housing 14 has thin, low friction spacers 31 and 33 which elevate the body of the housing a slight distance above surface 13. Spacers 31 and 33 may be made of Teflon or nylon so that the housing slides easily over the surface.

A second assembly of the present invention is surface 13, having a passive, position related array of two groups of lines. A first group of lines is characterized by reflection of one color of light and absorption of a second color of light. A second group of lines is characterized by reflection of the second color and absorption of the first color. For example, one color may be red and the other green. The surface would have one group of lines, for example vertical lines which would be colored green and a second group of lines, such as horizontal lines which would be red. In general, the green lines would reflect green light and absorb red light, while the red lines would reflect red light and absorb green light. The lines are drawn with ink having pigment particles with the desired optical property. Color should be uniform. Green ink would reflect most of the green light incident thereon and absorb most of any incident red light. The space between lines should be white, metallic reflective or otherwise highly reflective such that a sufficient contrast ratio exists between lines and spaces. The preferred line pattern is a grid, with red horizontal lines and green vertical lines, with reflective spaces between lines. The lines need not have as sharp and continuous definition as possible. The line pattern need not be a square grid, although this is easy to handle for computation purposes. Other line patterns, having position related geometry, may be used. In FIG. 1, a partial grid pattern 16 may be seen, with orthogonal dual color lines (color not shown) and white spaces between lines.

The mouse system of the present invention generates signals which instruct a cursor regarding movement up or down, left or right. There is no particular starting place for the housing on the surface. It may be brought down any place on the surface, so long as there is sufficient room to move the housing in a direction wherein cursor motion is desired. the preferable size for the housing is approximately 6 cm. in width and approximately 8 cm. in length. A preferred size for the surface would be approximately 22 cm. in width and approximately 30 cm. in length. These dimensions are not critical and the housing or surface may be larger or smaller as needed.

Figures 3, 3A:
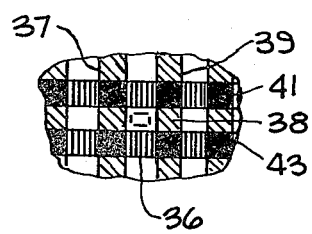
FIG. 3 is a plan view of a four-quadrant detector cell array for use in the apparatus of FIGS. 1 and 2.
FIG. 3a is a plan view of a portion of a grid pattern for use in the present invention, indicating the relative size of the area observed by the detector cell array of FIG. 3 in relation to the grid pattern.

In FIG. 3, the active area of detector 25 is represented by the square 35. This is a standard four-quadrant detector, such as Litronix SFH-204. The four quadrants of the active area are numbered in clockwise order, 1, 2, 3, 4. The two upper quadrants are both designated VB and the two lower quadrants are both designated VA (V for vertical), while the right hand column is designated HB and the left hand column is designated HA (H for horizontal). In FIG. 3a, the dashed line 36 indicates the relative area within a grid which forms the field of view of the detector illustrated in FIG. 3, relative to a grid of lines and in particular to the width of a line. The dashed line 36 represents the area imaged by the lens of the detector tube onto the detector array, such that each detector cell is capable of resolving or "seeing" the width of a line. This would not be possible if, for example, the size of the rectangle indicated by the dashed lines 36 were greater than the size of two grid spaces. Vertical lines 37 and 39 have a width approximately equal to grid space 38. Typically, the line width would be a few tenths of a millimeter, but in any case larger than the width resolved by a detector. For vertical lines, detector cells 1 and 2 must both be able to simultaneously observe the line, deriving HA and HB signals. Correspondingly, for horizontal lines 41 and 43, cells 2 and 3 must both be able to simultaneously observe the lines so that VA and VB signals can be generated.

In producing the line pattern of FIG. 3a, the entire surface starts as a reflective area. The inks or dyes used to print the lines shown in FIG. 3a are preferably transparent. Since any light reaching the detector is reflected from the underlying reflective surface, the underlying surface must have good reflectivity. Glossy white paper is adequate. Mylar may also be used. In the case where non-transparent inks or dyes are used for the lines, a problem will occur at line intersections where only the line printed last will be visible. To overcome this situation, the intersections must be made absorptive, i.e., dark, to both colors of light. This may require printing of inersections with a third, dark color, non-transparent ink or dye.

The desired output from the detectors is taken from three of the four cells, two horizontal bits from two horizontal cells and two vertical bits from two vertical cells. For example, HA and HB would be taken from cells one and two while VA and VB would be taken from cells three and two respectively. Cell four would not be used.

In the present invention, the LED source is capable of producing the two colors previously mentioned. At the time vertical lines appear at the detector, for example green illumination, the state of cells one and two in FIG. 3 would be saved (or cells three and four). At the time horizontal lines appear, for example under red illumination, the state of cells two and three are saved, or alternatively cells one and four. These saved states are transmitted to X and Y counters which are responsive to line crossings. The direction of a line crossing depends on the order of cell transitions. This is the reason that two cells are required for each of vertical and horizontal motions.

Figure 4:
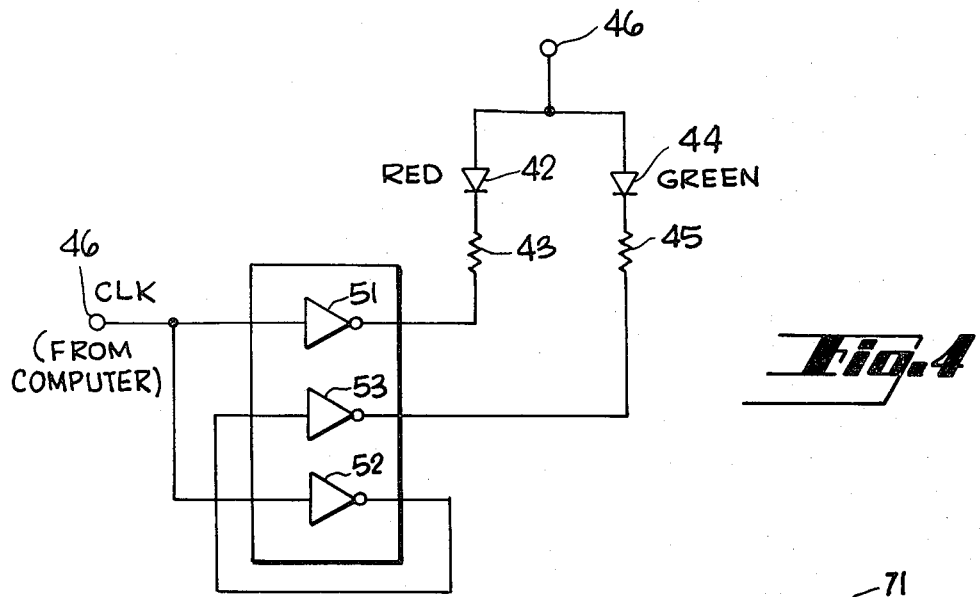
FIG. 4 is an electrical diagram of a circuit for activating the dual color source used in the system of FIGS. 1 and 2.

With reference to FIG. 4, a circuit for driving the source 15 is illustrated. The two colors of the LED can be supplied in the single package in a variety of ways, such as common anode, common cathode, or back-to-back diodes. The arrangement is indicated schematically with the diode 42 indicating a source of one color and the diode 44 indicating the source of another color. The anodes of each diode are connected to a common d.c. potential at terminal 46 which would typically be approximately 5 volts. The cathode of diode 42 is connected to a resistor 43, while the cathode of diode 44 is connected to resistor 45. Each of the diodes is driven by a square wave clock signal applied at terminal 47. Such a clock signal can be derived from a computer or other clock source. The clock frequency should be above 20k Hz and preferably about 100 k Hz. The clock signal for diode 42 is transmitted through inverter 51, while the clock signal for diode 44 is transmitted through inverters 52 and 53 in series, so that the phase of the clock signal across diode 42 is opposite diode 44. In this manner, the diodes will conduct on alternate half clock cycles. This creates sequential two color illumination of the lines within the field of view of the detector.

Figure 5:
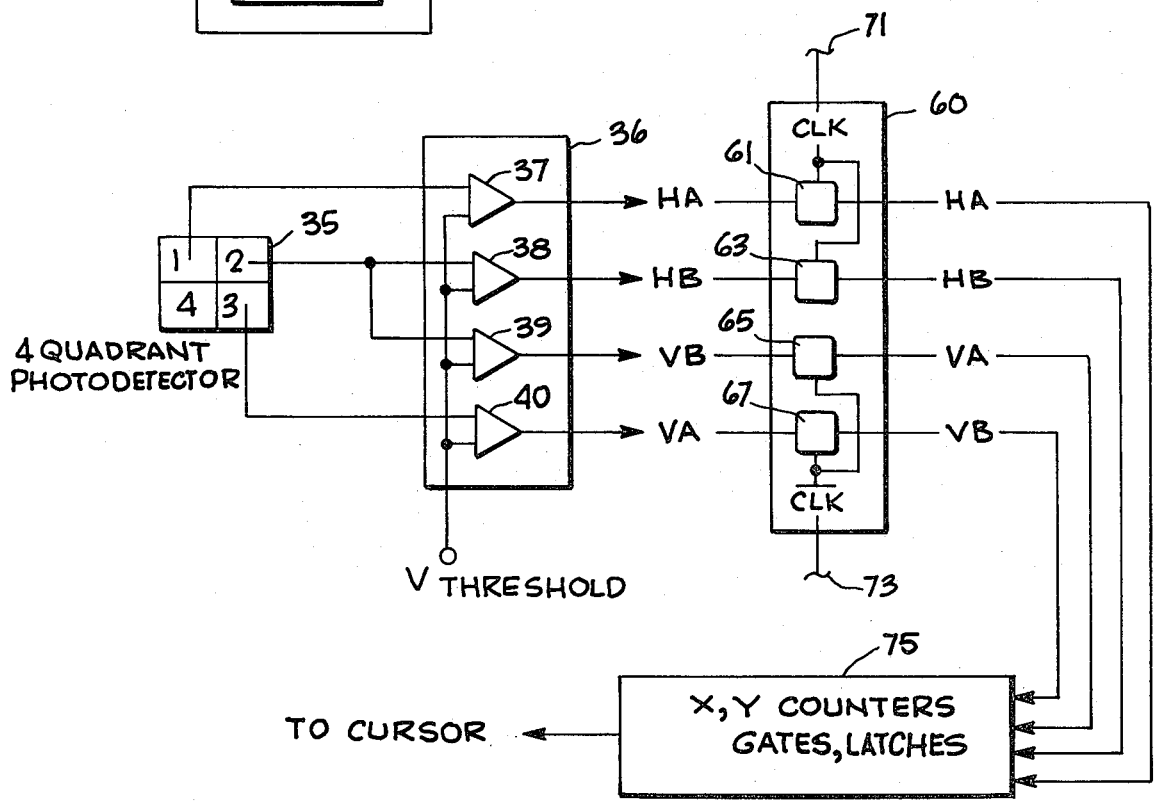
FIG. 5 is an electrical diagram of a circuit used with the four-quadrant detector, partially illustrated in FIG. 3.

In FIG. 5, the detector cell array 35 is seen to be connected to quad comparator circuit 36, which includes individual comparators 37, 38, 39 and 40. Each comparator receives a common reference signal from a voltage source, termed $V_{THRESHOLD}$. The output of each of the comparators does not switch until the threshold voltage is crossed in either direction. Once such a crossing occurs, the output of a comparator where such a crossing occurs changes state and such a state is latched by latch circuit 60. The threshold is crossed only when there is a significant change in contrast observed by the detector cells. For example, in counting vertical lines (green) to measure horizontal mouse travel, the detector would see reflective spaces between vertical lines. When crossing vertical lines, the green lines appear absorptive or dark under red light. The change in detector output signal occurring during the transition from the reflective condition to the absorptive condition crosses the $V_{THRESHOLD}$ level, switching the comparator state. Note that comparator 39 is not necessary since the output of this comparator can be taken from comparator 38. Hence, if an open collector clock signal is supplied from a computer, comparator 39 can be used to invert the clock signal. Hence, the inverter package is unnecessary.

Latch circuit 60 has latches 61, 63, 65 and 67 corresponding to electrically connected comparator output lines. The outputs from comparators 37 and 38 are seen to be the horizontal outputs HA and HB, respectively. The outputs from comparators 39 and 40 are seen to be the vertical outputs VB and VA, respectively. The latch circuits are clocked at clock terminals 71 and 73. Alternate half cycles, i.e., out of phase, are applied to terminals 71 and 73 so that on one half cycle HA and HB are gated into the latches, while on the alternate half cycle VA and VB are gated in. The latched signals, indicative of line crossings, are transmitted to the counters 71 which are commercially available and are exemplified by a computer manufactured by LISP Machine, Inc. of Cambridge, Massachusetts, or computers manufactured by Xerox Corporation and BBN of Cambridge, Mass. These computers are known to accept a code from many mechanical mice and the present code is identical to that produced by such mice. The output from the counter 75 is then fed to a cursor which is displayed on a video display or video terminal.

For interfacing to equipment specially designed for this mouse, the outputs of the quad comparator circuit 36 can be directly connected to a Motorola 6801 microcomputer chip which can be programmed to produce 12 bit counter outputs.

It should be noted that in the present invention diagonal motion of the mouse detector is not a problem because horizontal and vertical motions are completely orthogonal and separately reported. Rotations may be detected using the mouse configuration in FIG. 6. Here, two sources 91 and 92 are spaced from each other and from two corresponding detectors 93 and 94. The construction of the sources and detectors is as described with reference to FIGS. 1 and 2. By spacing these at a distance, the electrical circuits described herein can be duplicated so that the motion of two points whose distance from each other is fixed can be determined. By knowing the relative motion of these two points, it is easy to determine the rotational orientation of the mouse so that both translation and rotation may be noted.

In an alternate embodiment of the invention, two sources may be provided which are on continuously. Two detectors are used, as shown in FIG. 6, except that one detector is sensitive only to one color, while the other detector is sensitive to the opposite color. Each detector would have only two active cells. One detector would have two cells aligned for HA and HB detection, while the other detector would have orthogonal cells for VA and VB detection. In this embodiment, clocking is not necessary since the sources and detectors are on continuously. In the embodiment previously described with reference to FIGS. 1 and 2, the detector was sensitive to all wavelengths of illumination. However, by clocking the detector output, the output signals could be synchronized with the source. In the latter embodiment, such clocking is not necessary. However, the detectors must have sufficient color sensitivity that an adequate contrast ratio can be observed when line crossings occur.

In this patent application, the lines have been referred to as red and green lines. The lines are not restricted to these colors. Other colors may be used, including colors that are reflective to infrared or ultraviolet.

I claim:

1. A position control system for a cursor or the like comprising,
    a surface having a pattern of passive, position-related lines thereon, with a first group of lines characterized by reflection of one color and absorption of a second color and a second group of lines characterized by reflection of the second color and absorption of the first color,
    a detector means, movable over the surface, having a light source directed at the surface, alternately emitting light of said first and second colors, upon receipt of clock pulses, and a light detector positioned for receiving light reflected from the surface and producing electrical output signals representing reflection from lines in said first and second groups of lines, clock means connected to said source and detector for generating clock pulses timing said light source and synchronizing the detector output signals to the source, and counter means connected to receive said electrical signals for counting said lines during detector motion over the surface, thereby deriving a position signal for a cursor or the like.

2. The apparatus of claim 1 wherein said first and second groups of lines are parallel, mutually orthogonal lines of equal width.

3. The apparatus of claim 2 wherein said lines are uniformly spaced with spaces of a width dimension equal to the width of the lines.

4. The apparatus of claim 2 wherein the first group of line reflects green light and the second group reflects red light.

5. The apparatus of claim 1 wherein said light detector is a four-quadrant detector having three active cells.

6. A position control system for a cursor or the like comprising, a surface having a pattern of passive, position-related lines thereon, with a first group of lines characterized by reflection of one color and absorption of a second color and a second group of lines characterized by reflection of the second color and absorption of the first color, a detector means, movable over the surface, having a pair of light sources emitting light of said two different colors, the sources directed at the surface, and a pair of light detectors each sensitive to one of said two different colors, the detectors positioned for receiving light reflected from the surface and producing electrical output signals representing reflection from lines in said first and second groups of lines, counter means connected to receive said electrical signals for counting said lines during detector motion over the surface, thereby deriving a position signal for a cursor or the like.

7. The apparatus of claim 6 wherein said first and second groups of lines are parallel, mutually orthogonal lines of equal width.

8. The apparatus of claim 7 wherein said lines are uniformly spaced with spaces of a width dimension equal to the width of the lines.

9. The apparatus of claim 7 wherein the first group of lines reflects green light and the second group reflects red light.

10. The apparatus of claim 6 wherein said light detector is arranged with two groups of two cells each.

* * * * *